US010749573B2

(12) United States Patent
Pavageau

(10) Patent No.: US 10,749,573 B2
(45) Date of Patent: Aug. 18, 2020

(54) ANTENNA CONFIGURED TO CONFORM TO A TRANSPARENT SURFACE, CORRESPONDING DISPLAY DEVICE AND ELECTRONIC PAYMENT DEVICE

(71) Applicant: INGENICO GROUP, Paris (FR)

(72) Inventor: Stephane Pavageau, La Roche de Glun (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 16/603,976

(22) PCT Filed: Apr. 9, 2018

(86) PCT No.: PCT/EP2018/059042
§ 371 (c)(1),
(2) Date: Oct. 9, 2019

(87) PCT Pub. No.: WO2018/189117
PCT Pub. Date: Oct. 18, 2018

(65) Prior Publication Data
US 2020/0153482 A1    May 14, 2020

(30) Foreign Application Priority Data
Apr. 10, 2017  (FR) .................................... 17 53120

(51) Int. Cl.
*H01Q 1/24*     (2006.01)
*H04B 5/00*     (2006.01)
(Continued)

(52) U.S. Cl.
CPC .......... *H04B 5/0031* (2013.01); *G06F 3/041* (2013.01); *H01Q 1/22* (2013.01); *H01Q 1/52* (2013.01);
(Continued)

(58) Field of Classification Search
CPC ..... H04B 5/0031; H04B 5/0081; G06F 3/041; H01Q 1/22; H01Q 1/52; H01Q 7/00;
(Continued)

(56) References Cited

U.S. PATENT DOCUMENTS 9,178,572 B1 * 11/2015 Zhang .................. H01Q 1/44
10,249,944 B1 *  4/2019 Ng ...................... H01Q 1/243
2014/0327598 A1  11/2014 Zhu

FOREIGN PATENT DOCUMENTS

EP       1868263 A1    12/2007

OTHER PUBLICATIONS

International Search Report dated Jun. 28, 2018 for corresponding International Application No. PCT/EP2018/059042, filed Apr. 9, 2018.
(Continued)

*Primary Examiner* — Lee Nguyen
(74) *Attorney, Agent, or Firm* — David D. Brush; Westman, Champlin & Koehler, P.A.

(57) ABSTRACT

There is proposed an antenna configured to conform to a transparent surface. Such an antenna includes at least one electrically conductive strand extending along the surface, a cross-section of the at least one electrically conductive strand has a height, in a direction orthogonal to the surface, that is greater than a width in a direction parallel to the surface.

10 Claims, 4 Drawing Sheets

(51) Int. Cl.
  *H01Q 1/22*   (2006.01)
  *G06F 3/041*   (2006.01)
  *H01Q 7/00*   (2006.01)
  *H01Q 1/52*   (2006.01)
  *H01Q 1/44*   (2006.01)
  *G07F 19/00*   (2006.01)

(52) U.S. Cl.
  CPC ............ *H01Q 7/00* (2013.01); *H04B 5/0081* (2013.01); *G07F 19/20* (2013.01)

(58) Field of Classification Search
  CPC ........ H01Q 1/38; H01Q 9/065; H01Q 13/106; G07F 19/20
  USPC ........................................................ 455/41.1
  See application file for complete search history.

(56) References Cited

OTHER PUBLICATIONS

Written Opinion of the International Searching Authority dated Jun. 28, 2018 for corresponding International Application No. PCT/EP2018/059042, filed Apr. 9, 2018.

English translation of the International Written Opinion of the International Searching Authority dated Jul. 6, 2018 for corresponding International Application No. PCT/EP2018/059042, filed Apr. 9, 2018.

\* cited by examiner

ANTENNA CONFIGURED TO CONFORM TO A TRANSPARENT SURFACE, CORRESPONDING DISPLAY DEVICE AND ELECTRONIC PAYMENT DEVICE

CROSS-REFERENCE TO RELATED APPLICATIONS

This Application is a Section 371 National Stage Application of International Application No. PCT/EP2018/059042, filed Apr. 9, 2018, the content of which is incorporated herein by reference in its entirety, and published as WO 2018/189117 A1 on Oct. 18, 2018, not in English.

1 TECHNICAL FIELD

The field of the invention is that of antennas for short-distance or small-distance wireless communications.

More specifically, the invention relates to an antenna of this kind configured to be associated with a surface, such as a display screen, that has to be seen by a user.

The invention thus has many applications, especially but not exclusively in the context of electronic payment devices embedding a payment technology known as contactless technology or in the context of advertisement displays offering a user additional information on displayed products in return for an exchange of information between his smartphone and the NFC® (Near Field Communication) chip embedded on the display.

2 TECHNOLOGICAL BACKGROUND

When a display device integrates an antenna for short-distance or small-distance wireless communications, e.g. an NFC antenna, problems arise with the integration of this antenna concerning the discomfort caused to a user seeking to view displayed information as well as with the very performance of the antenna.

Thus, a first known approach to integrating an NFC antenna without causing discomfort to a user wanting to view information displayed on the display device consists in placing the antenna behind the display screen of the device in question. However, it can be seen that the working of the screen and of the corresponding electronics disturbs and/or absorbs the communications between transmitter and receiver, thus impairing the quality of the NFC link.

Another known approach consists in disposing the antenna on the rim of the screen of the display device. However, the goal often sought when integrating such a short-distance or small-distance wireless communications technology distance is often that the user should be able to access a piece of information by placing his terminal (for example his smartphone) at a specific position on the display screen, this position possibly depending on the content displayed. When the size of the screen increases, it is then difficult or even impossible to ensure a uniformity of a field on the entire surface of the display screen through an antenna disposed on the rim of this screen. More particularly, from a certain screen size onwards, the magnetic field collapses at the center of the screen.

Besides, attempts have been made to obtain conductive materials that enable the manufacture of transparent radiant elements that can be disposed directly on the display screen. Such materials are for example indium oxide, graphene or copper nanomesh. However, it appears that the conductors obtained are far too resistive to envisage a realistic implementation of the antenna. The fact is that, since the field generated is proportional to the current flowing in the antenna, extremely high power (or a very high voltage) is needed to obtain the desired field value which is not always compatible with the working of integrated circuits dedicated to NFC-type short-distance or small-distance wireless communications.

There is thus a need for an antenna that minimizes the discomfort caused to a user looking at information presented on a display device into which the antenna in question is integrated.

It is also necessary that the radiofrequency link between the antenna in question and the transmission/receiver with which it communicates should be unimpaired when the antenna is integrated into the display device.

There is also a need for these goals to be achieved independently of the size of the screen of the display device.

3 SUMMARY

One embodiment of the described technique proposes an antenna configured to conform to a transparent surface. Such an antenna comprises at least one electrical conductive strand extending along the surface, a cross-section of the at least one electrical conductive strand having a height, in a direction orthogonal to the surface, that is at least five times greater, and preferably ten times greater, than a width in a direction parallel to said surface.

Thus, the invention proposes a novel and inventive solution to making an antenna conformed to a transparent surface that reduces the discomfort caused by its presence when a user looks through the surface in question.

Indeed, for reasons of simplicity of making and shaping, the antennas conformed to a surface are conventionally implemented in the form of antennas, the radiant elements of which are tracks of printed-circuit boards. Such antennas thus comprise appreciably flat conductors that are parallel to the surface.

Now, the described technique proposes to implement the same type of electrical conductors forming the antenna perpendicularly to the surface in question.

Thus, the zone of opaqueness caused by the presence of the antenna is reduced especially when the user looks through the surface in question from a direction appreciably perpendicular to this surface. At the same time, the invention makes it possible to keep the impedance of the antenna at a level low enough for NFC type applications.

According to one embodiment, the at least one electrical conductive strand is in contact with a first transparent medium having an optical index $n_1 > 1.4$ at the level of at least one first contact zone extending at least partly perpendicularly to the surface.

Thus, the effective height $h_{e\!f\!f}$ (i.e. the height as seen by a user looking through the surface along a range of angles of view $i_1$ relative to the normal to the surface) is smaller than the real height of the antenna, making the antenna almost invisible to this user.

According to one embodiment, the at least one electrical conductive strand is in contact with a second transparent medium having an optical index $n_2 \geq 1$ at the level of at least one second contact zone extending at least partly perpendicularly to the surface, the second transparent medium being in contact with a first transparent medium having an optical index $n_1 \geq n_2$ at the level of at least one first contact zone extending at least partly perpendicularly to the surface. The first and second contact zones each have at least one region facing each other.

Thus a "broken glass" appearance is obtained on a range of angles of view $i_1$ of the user looking through the surface in question, thereby making the antenna invisible on this range of angles of view.

According to one embodiment, the second transparent medium is air.

Thus, the solution is simple and economical.

Besides, the difference in optical index between the first and second transparent media is maximized, thus giving the "broken glass" effect on a greater range of angles of view i1 relative to the normal of the surface.

According to one embodiment, one electrical conductive strand among the at least one electrical conductive strand comprises a conductive track etched on a transparent substrate disposed perpendicularly to the surface, optical clear adhesives being disposed on the transparent substrate on either side of the conductive track, an air film being formed on a surface of the conductive track when the first transparent medium is attached to the optical clear adhesives.

Thus, a film of air, corresponding to the second transparent medium in this embodiment, is easily constituted during the assembling of the conductive strand and of the first transparent medium.

Besides, the use of optical clear adhesives as well as of a transparent substrate (for example a poly(ethylene terephthalate) or PET substrate on which the conductive track is etched (for example a copper track) ensures optical continuity on either side of the conductive track, thus reinforcing the invisible character of the antenna for the user looking through the surface.

According to one embodiment, the assembly comprising the electrical conductive track, the optical clear adhesives and the first transparent medium is disposed in a groove preliminarily formed in a third transparent medium, a transparent resin holding the assembly in the groove.

Thus, the fabrication of the assembly in question and therefore the obtaining of the film of air corresponding to the second transparent medium is facilitated because it is executed prior to the insertion of the assembly in question into the groove.

According to one embodiment, a surface zone of the first transparent medium is polished at the level of the at least one first contact zone.

Thus, a mirror effect is obtained at the contact zone forming an "optical polish" between the first and second transparent media, thereby reinforcing the invisible character of the antenna.

According to one embodiment, the first transparent medium or the third transparent medium comprise a matrix of electrical conductive strands comprising said at least one electrical conductive strand, the conformed antenna resulting from a preliminary electrical interconnection of a plurality of electrical conductive strands of the matrix.

Thus, the appearance of the transparent surface related to the presence of the antenna is made uniform throughout the surface.

Besides, the geometry of the antenna or antennas implemented on the surface in question is configurable, thereby making the solution flexible and economical.

According to one embodiment, the antenna is composed of at least two electrical conductive strands forming two electrical pathways placed in parallel.

Thus, in order to maintain the impedance of the antenna as defined, the dimensions of the section of the strands composing it are divided in the ratio of the number of strands put in parallel. The effective height of the section of the strands forming the antenna thus obtained is even smaller.

According to one embodiment, the antenna is sized to receive and radiate an electromagnetic wave at a carrier frequency of 13.56 MHz modulated according to the NFC standard.

The technique described also relates to a display device comprising:

a display screen (520); and an antenna (according to any one of the different embodiments mentioned here above) conformed to an external reading surface of the display screen corresponding to the transparent surface.

Thus, the antenna according to the invention described can be disposed on a display screen because it has minimum impact on the visibility of the information displayed on the screen in question.

As a result, the setting up of a radiofrequency link with an external communications device is optimal since the invention according to the technique described is not masked by the display screen.

This effect is, besides, obtained independently of the size of the display screen.

The technique described also relates to an electronic payment device characterized in that it comprises the display device according to any one of the different embodiments mentioned here above.

Thus, the use of a display device according to the technique described enables optimal contactless payment while ensuring minimum disturbance of the visibility of the information displayed on this screen for the user of the payment device.

4 LIST OF FIGURES

Other features and advantages of the invention shall appear from the following description, given by way of an indicative and non-restrictive example and from the appended figures of which:

FIGS. 1a and 1b present an antenna conformed to a transparent surface according to one embodiment of the technique described as well as a magnified view of an electrical conductive strand included in the antenna in question;

5 DETAILED DESCRIPTION OF THE INVENTION

In all the figures of present document, the identical elements and steps are designated by a same reference.

The general principle of the technique described consists of an antenna configured to conform to (i.e. placed "parallel to" or "alongside") a transparent surface. Such an antenna comprises at least one electrical conductive strand extending along the transparent surface, a cross-section of at the least one electrical conductive strand having a height in a direction orthogonal to the surface in question that is greater than a width in a direction parallel to the surface. Thus, the zone of opaqueness caused by the presence of the antenna on the transparent surface is reduced, especially when the user looks through the surface in question from a direction substantially perpendicular to this surface.

Figure 1A:
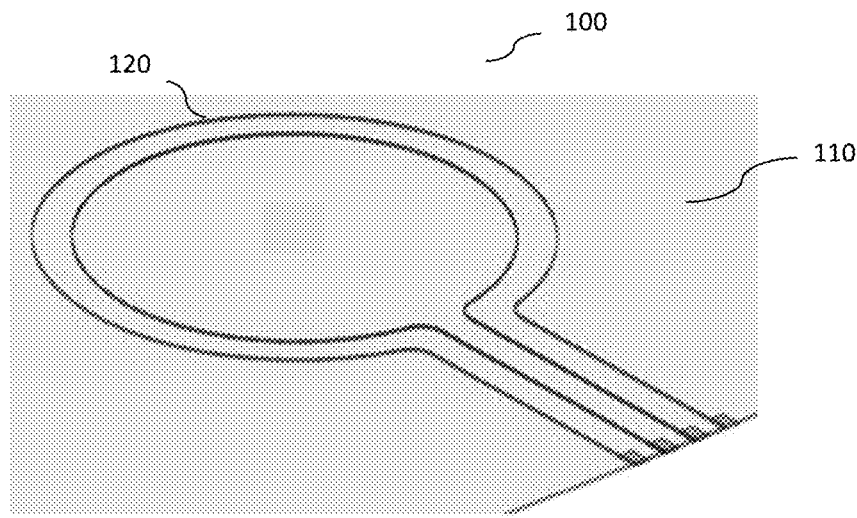
Figure 1B:
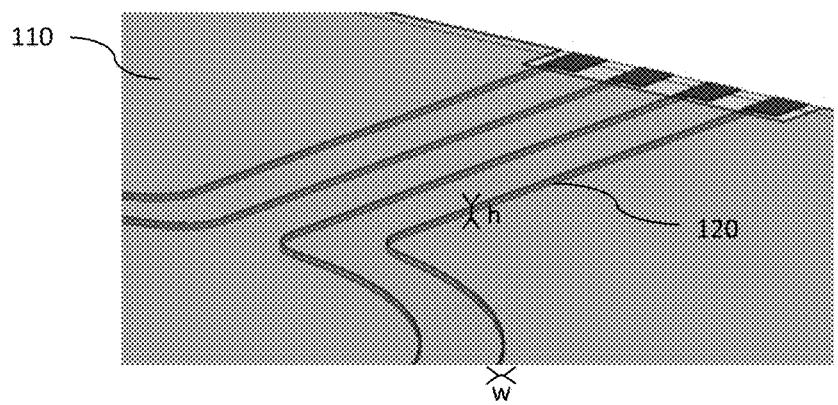

Referring to FIGS. 1a and 1b, we now describe an antenna conformed to a transparent surface according to one embodiment of the described technique as well as a magnified view of an electrical conductive strand included in the antenna in question.

There are known ways of using a loop-type antenna or double-loop type antenna for data transmission according to the NFC protocol. The physical dimensions of such an antenna are guided by the quality of the field obtained in the coupling zone as well as by the impedance seen from the generator feeding the antenna at the carrier frequency of 13.56 MHz. This impedance must remain low, typically below 1 Ohm or 2 Ohms.

In the context of a micro-strip type printed circuit technology with copper tracks (classic technology in the field of NFC transponders), a typical sizing leads to the use of a printed track with a thickness of the order of 30 μm in a direction perpendicular to the substrate on which the track is printed (i.e. a thickness of the order of twice the skin thickness at 13.56 MHz for copper). Similarly, a classic track width is 350 μm in a direction parallel to the substrate on which the track is printed and perpendicular to the track for a double-loop antenna with a diameter of 40 mm in order to maintain the desired impedance around 1 Ohm.

When the substrate closely follows a surface on which the antenna must be disposed, the conductive track is then shaped on this surface, i.e. made appreciably parallel to this surface, thus partly masking the surface in question even when the surface is implemented in a transparent material.

On the contrary, an antenna 100 according to the technique described in the present application is configured to conform to a transparent surface 110 and comprises at least one electrical conductive strand 120 extending along the surface, a cross-section of which has a height h in a direction orthogonal to the surface 110, greater than a width w in a direction parallel to the surface 110.

Thus, the prior-art NFC double-loop antenna described here above can be adapted to the described technique so as to obtain the antenna 100 comprising at least one electrical conductive strand 120 having a height h of 350 μm and a width w of 30 μm (by way of comparison, a hair measures 50 to 100 μm in diameter), i.e. an h-to-w ratio greater than 10 in order to maintain the impedance of the antenna at less than 1 Ohm. As an alternative, if 2 Ohms is accepted as the upper limit for the impedance of the antenna, an h-to-w ratio greater than 5 is sufficient.

Such an electrically conductive strand 120 forming the antenna 100 thus has its smallest dimension in the direction parallel to the surface 110. Thus, the zone of opaqueness generated by the presence of the antenna 100 is limited. The discomfort caused to a user looking through the transparent surface 110 from a direction substantially perpendicular to this surface 110 is therefore very greatly reduced.

Figure 2:
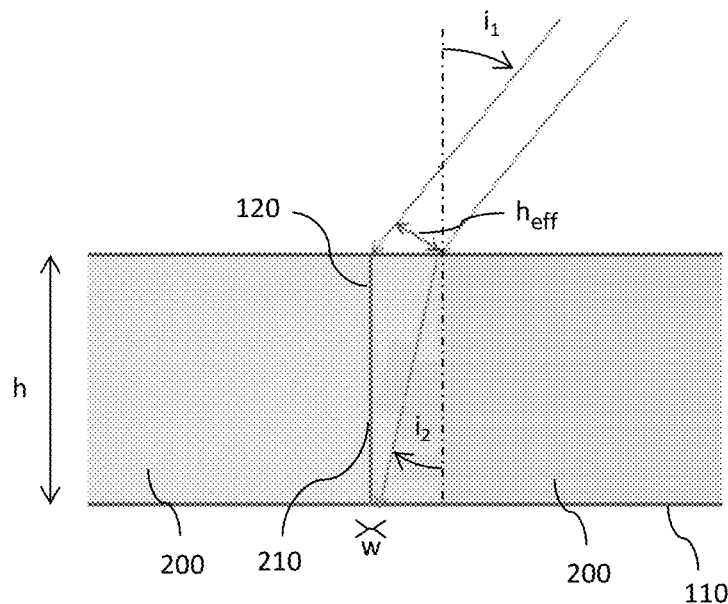
FIG. 2 illustrates an electrical conductive strand included in an antenna conformed to a transparent surface according to one embodiment of the described technique.

Referring now to FIG. 2, a description is provided of an electrically conductive strand included in an antenna conformed to a transparent surface according to one embodiment of the described technique.

According to this embodiment, the electrical conductive strand 120 is in contact with a first transparent medium 200 with an optical index $n_1>1.4$ at the level of at least one first contact zone 210 extending at least partly perpendicular to the transparent surface 110.

To this end, in different variants, the electrical conductive strand 120 is obtained by:
  Overmolding the first transparent medium 200 on an electrical conductor;
  Transparent bonding (e.g. by means of an optical clear adhesive) of an electrical conductor on an edge of the first transparent medium 200; or
  Metalizing an edge of the first transparent medium 200.

More particularly, the first transparent medium 200 is formed by a transparent plastic material, for example a PC (polycarbonate) having an optical index of 1.59 or a PMMA poly(methyl methacrylate) having an optical index of 1.49.

When the user looks through the surface 110 along a given range of angles of view $i_1$ relative to the normal of the surface, the law of optical refraction (known as the Snell-Descartes law) causes the user to see the electrical conductive strand 120 at an effective height $h_{eff}$ that is lower than the physical height h proportionally to the sine of the index $n_1$ of the first transparent medium 200.

For example when PC, which has an optical index of 1.59, is used as a first transparent medium 200 or when the user looks through the surface 110 at an angle of view $i_1$ equal to 20°, he sees an effective height $h_{eff}$ of the conductive strand 120 (in contact with the first transparent medium 200 made of PC) of 72 μm for a physical height h of 350 μm. The apparent height of the antenna is therefore divided by 4 thus making the antenna almost invisible to this user.

Figure 3A:
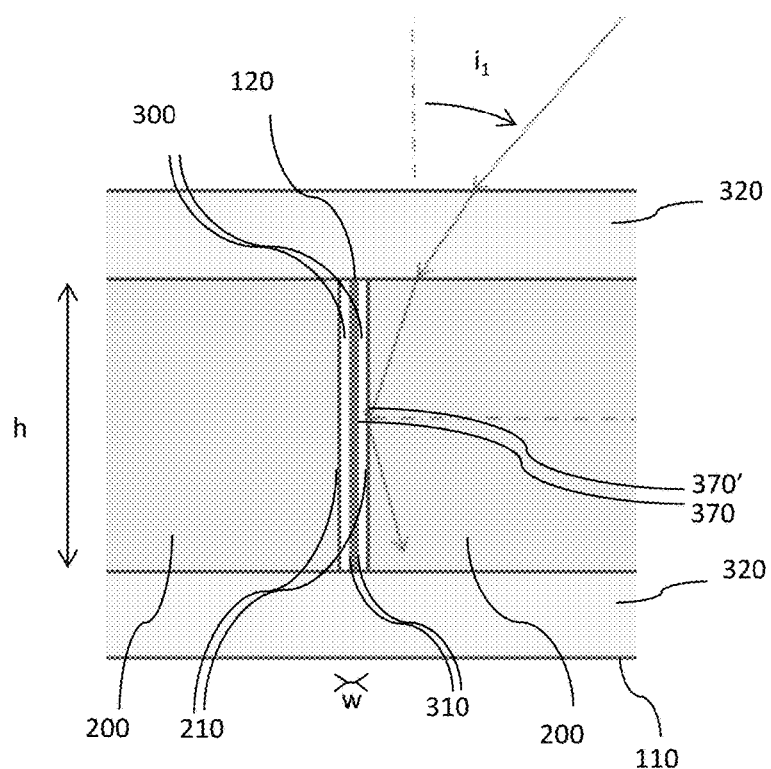
FIGS. 3a, 3b and 3c illustrate an electrical conductive strand included in an antenna conformed to a transparent surface according to different embodiments of the described technique.
Figure 3B:
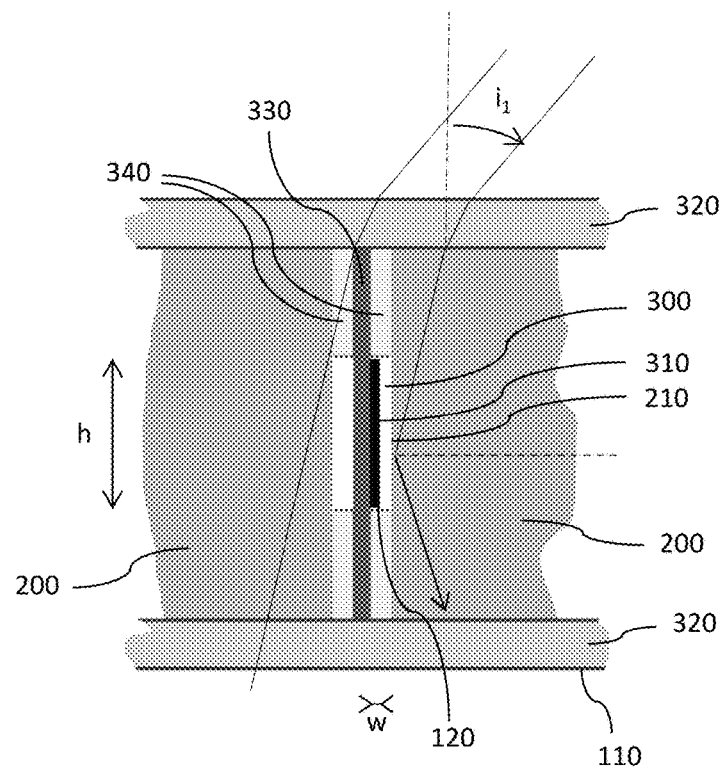
Figure 3C:
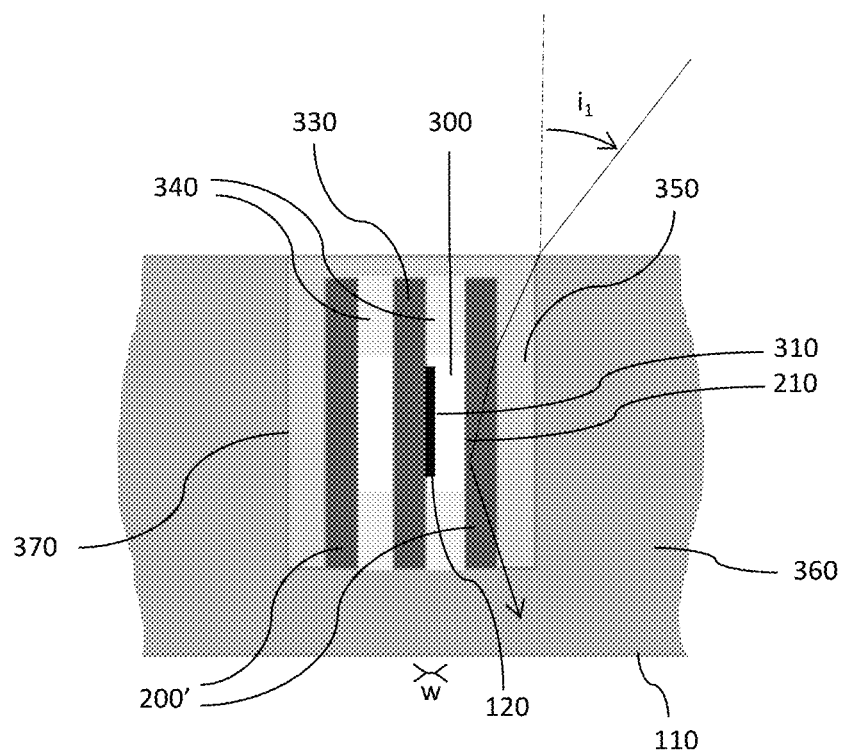

Referring now to FIGS. 3a, 3b and 3c we present an electrical conductive strand included in an antenna conformed to a transparent surface according to other embodiments of the described technique.

In these embodiments, the electrical conductive strand 120 is in contact with a second transparent medium 300 having an optical index $n_2>1$ at the level of at least one second contact zone 310 extending at least partly perpendicularly to the transparent surface 110.

Besides, the second transparent medium 300 is in contact with a first transparent medium 200, 200' having an optical index $n_1>n_2$ at the level of at least one first contact zone 210 extending at least partly perpendicularly to the transparent surface 110.

Similarly, the first contact zone 210 and second contact zone 310 each have at least one region 370, 370' facing each other. In other words, they are not contained in a same plane and are disposed on one and the same side of the electrical conductive strand 120 so that the "broken glass" appearance obtained effectively conceals the strand 120 in question.

Thus, when the user looks through the surface 110 at a given range of angles of view $i_1$ relative to the normal of the surface, the law of optical refraction leads to a reflection of the light rays at the level of the at least one first contact zone 210. In other words, the light rays never reach the electrical conductive strand 120, leading to a "broken glass" appearance. The electrical conductive strand 120 is thus invisible to the user at the range of angles of view $i_1$ in question.

According to one variant, the second transparent medium 300 is air, i.e. a medium with an optical index $n_2=1$, or very slightly greater. As a result, a major difference in optical index between the first transparent medium 200 and a second transparent medium 300 is obtained, thus giving a "broken glass" effect on a far wider range of angles of view $i_1$ relative to the normal of the surface.

To this end, according to a first embodiment (FIG. 3a), the electrical conductive strand 120 is disposed between two films with polished edge corresponding to the first transparent medium 200 while leaving a film of air corresponding to the second transparent medium 300, on either side of the electrical conductive strand 120. The unit is then held by the bonding or overmolding of two films 320, for example made of transparent plastic (e.g. PC or PMMA), on either side of the assembly.

According to a second embodiment (FIG. 3b) the electrical conductive strand 120 comprises an etched conductive track (for example a copper track) on a transparent substrate 330 (for example a polyethylene terephthalate (PET)) substrate disposed perpendicularly to the transparent surface 110. Optical clear adhesives (OCAs) 340 are disposed on the transparent substrate 330 on either side of the etched conductive track, without overlapping this very same track. A film of air corresponding to the second transparent medium 300 is then formed on the surface of the conductive track when the first transparent medium 200 is attached to the optical clear adhesives 340.

Thus, the film of air corresponding to the second transparent medium 300 is easily constituted during the assembling of the electrical conductive strand 120 and the first transparent medium 200.

Besides, the use of optical clear adhesives 340 as well as of the transparent substrate 330 on which the conductive track is etched ensures optical continuity on either side of the conductive track thus reinforcing the invisible character of the antenna for the user looking through the surface.

In one variant, the unit is also maintained by bonding or overmolding of two films 320, for example made of transparent plastic, on either side of the assembly.

In another variant, the optical clear adhesives 340 are disposed on only one side of the etched conductive track. As a result, the electrical conductive strand 120 can be secured to one of the two film 320.

Thus, when such an antenna is disposed on a display screen (an external reading surface of the display screen corresponding to the transparent surface 110), the antenna 100 is nearer to what is displayed on the display screen. The display screen is thus even less deformed by the presence of the antenna 100. In other embodiments, a surface zone of the first transparent medium 200, 200' is polished at the level of the at least one first contact zone 210. Thus, a mirror effect is obtained at the at least one first contact zone 210 forming an "optical polish" between the first transparent media 200, 200' and second transparent medium 300, thereby reinforcing the "broken glass" appearance and therefore the invisible nature of the electrical conductive strand 120 ultimately.

Figure 4:
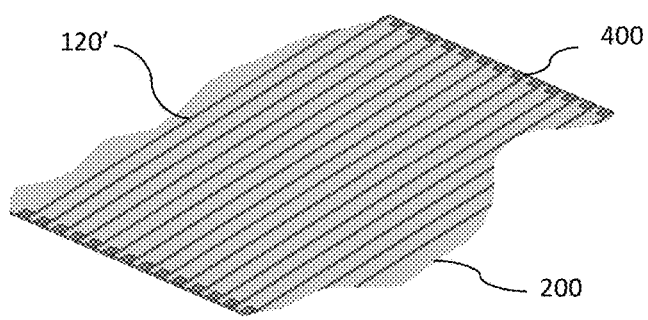
FIG. 4 illustrates a matrix of electrical conductive strands according to one embodiment of the described technique.

Referring to FIG. 4, a description is now provided of a matrix of electrical conductive strands according to one embodiment of the described technique.

In this embodiment, the first transparent medium 200 or the third transparent medium 360 comprises a matrix 400 of electrical conductive strands 120' (herein parallel with one another even though other patterns can be envisaged), each possibly being made according to any one of the above-mentioned embodiments.

The antenna 100 then results from a preliminary electrical connection of a plurality of electrical conductive strands 120' of the matrix 400.

The geometry of the antenna 100 implemented on the surface 110 in question is thus configurable, thus making the solution flexible and economical.

Besides, the appearance of the transparent surface 110 is made uniform.

In other embodiments, the antenna 100 is formed by at least two electrical conductive strands 120, 120' (according to any one of the above-mentioned embodiments) forming two electrical pathways placed in parallel.

As a result, since the impedance of the antenna 100 has to be maintained at a target value, the dimensions of the section of the electrical conductive strands 120, 120' placed in parallel are divided in the ratio of the number of strands involved in this parallel-setting operation. In particular, the effective height and/or thickness of the section of the electrical conductive strands 120, 120' in question is further reduced, making the antenna 100 thus obtained even more discreet.

Figure 5:
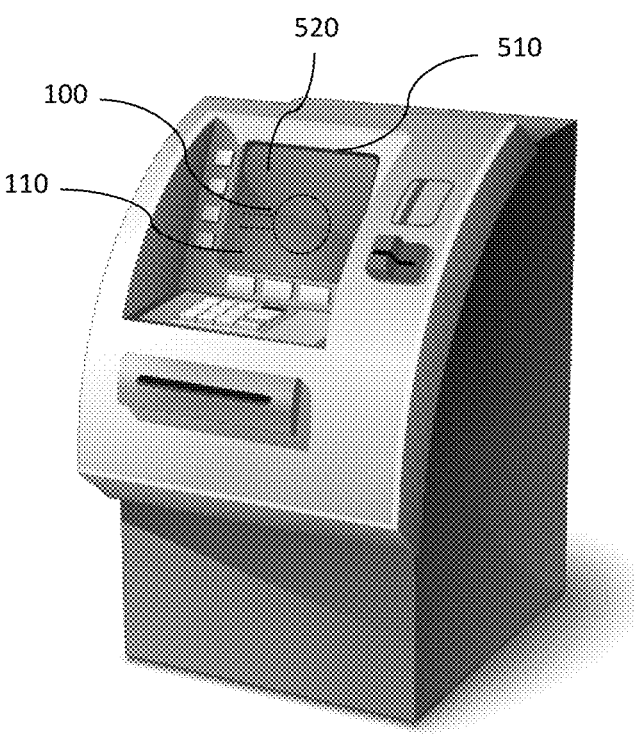
FIG. 5 illustrates an electronic payment terminal comprising a display device embodiment of the invention.

Referring to FIG. 5, we now describe an electronic payment terminal comprising a display device integrating an antenna conformed to a transparent surface according to one embodiment of the described technique.

The payment terminal 500 comprises a display device 510 integrating both a display screen 520 and an antenna 100 according to any one of the above-mentioned embodiments.

More particularly, an external reading surface of the display screen 520 corresponds to the transparent surface 110 to which the antenna 100 is conformed.

As a result, the setting up of a radiofrequency link with an external communications device is optimal, since the antenna according to the described technique is not masked by the display screen.

Besides, this effect is obtained independently of the size of the display screen, the dimension of the antenna 100 being dictated only by questions of radiation efficiency and not by the size of the display screen 520 as is the case when the antenna is disposed on the rim of the screen 520 as in prior-art solutions.

It is besides significant that the antenna 100 according to the invention can be used in a display device 510 comprising a screen 520 of any unspecified size. Indeed, the use of such an antenna 100 in the described technique ensures minimum disturbance of the visibility of information displayed on the screen, independently of the size of this screen.

The antenna 100 according to the invention can thus be used to equip other types of payment devices such as electronic payment terminals or automatic teller machines (ATMs).

This can also apply to the equipping of devices other than those dedicated to payment, for example display screens (for example an interactive connected advertising screen or a public display screen) such as those found in bus shelters for example.

The invention claimed is:

1. An antenna configured to conform to a transparent surface, said antenna comprising:
   at least one electrically conductive strand extending along said surface,
   wherein said at least one electrically conductive strand has a cross-section which has a height, in a direction orthogonal to said surface, that is at least five times greater than a width in a direction parallel to said surface.

2. The antenna according to claim 1 wherein said at least one electrical conductive strand is in contact with a first transparent medium having an optical index $n_1 > 1.4$ at a level of at least one first contact zone extending at least partly perpendicularly to said surface.

3. The antenna according to claim 2, wherein:
   said first transparent medium comprises a matrix of electrically conductive strands comprising said at least one electrically conductive strand, and
   said conformed antenna results from a preliminary electrical interconnection of a plurality of electrically conductive strands of said matrix.

4. The antenna according to claim 1 wherein:
said at least one electrical conductive strand is in contact with a second transparent medium having an optical index $n_2 \geq 1$ at a level of at least one second contact zone extending at least partly perpendicularly to said surface,
the second transparent medium being in contact with a first transparent medium having an optical index $n_1 > n_2$ at a level of at least one first contact zone extending at least partly perpendicularly to said surface,
said first and second contact zones each having at least one region facing each other.

5. The antenna according to claim 4 wherein said second transparent medium is air.

6. The antenna according to claim 4 wherein a surface zone of said first transparent medium is polished at the level of said at least one first contact zone.

7. The antenna according to claim 1, wherein the at least one electrically conductive strand comprises at least two electrically conductive strands, and said antenna is composed of the at least two electrically conductive strands, which form two electrical pathways placed in parallel.

8. The antenna according to claim 1, which is sized to receive and radiate an electromagnetic wave at a carrier frequency of 13.56 MHz.

9. A display device comprising:
a display screen comprising an external reading surface corresponding forming a transparent surface; and
an antenna conformed to the external reading surface of said display screen,
the antenna comprising:
at least one electrically conductive strand extending along said external reading surface, wherein said at least one electrically conductive strand has a cross-section which has a height, in a direction orthogonal to said external reading surface, that is at least five times greater than a width in a direction parallel to said external reading surface.

10. An electronic payment device comprising the display device according to claim 9.

* * * * *